United States Patent

Bauer et al.

[11] Patent Number: 4,646,206
[45] Date of Patent: Feb. 24, 1987

[54] CONTROL UNIT

[75] Inventors: Karl-Heinz Bauer; Reinhold Wolf, both of Bad Neustadt, Fed. Rep. of Germany

[73] Assignee: Preh Elektrofeinmechanische Werke Jakob Preh Nachf. GmbH & Co., Bad Neustadt, Fed. Rep. of Germany

[21] Appl. No.: 658,487

[22] Filed: Oct. 9, 1984

[30] Foreign Application Priority Data

Oct. 10, 1983 [DE] Fed. Rep. of Germany ....... 3336828
Mar. 14, 1984 [DE] Fed. Rep. of Germany ....... 3409260

[51] Int. Cl.[4] .......................... F21V 8/00; G05G 1/00
[52] U.S. Cl. .......................................... 362/32; 362/29;
362/23; 362/26; 98/2.05; 98/2.08; 116/28 R;
116/DIG. 5; 74/110; 74/502; 74/503; 251/250
[58] Field of Search ....................... 362/23, 29, 32, 26,
362/253; 165/11.1, 24, 25, 42, 43; 74/502, 503,
109, 110, 89.17; 116/DIG. 5, 28 R; 236/94, 13;
237/12.3 R; 98/2, 2.05, 2.08; 251/250

[56] References Cited

U.S. PATENT DOCUMENTS

| 262,020 | 8/1882 | Dilger | 74/109 |
|---|---|---|---|
| 2,613,630 | 10/1952 | McNairy | 236/94 |
| 2,732,723 | 1/1956 | Crofton | 74/110 |
| 2,772,574 | 12/1956 | Thomas | 74/110 |
| 3,191,669 | 6/1965 | Johnson et al. | 165/42 X |
| 3,298,172 | 1/1967 | Bodkina | 362/29 X |
| 4,222,435 | 9/1980 | Kumagai | 165/11.1 |
| 4,257,084 | 3/1981 | Reynolds | 362/26 X |

FOREIGN PATENT DOCUMENTS

| 58304 | 1/1975 | Australia | 74/110 |
|---|---|---|---|
| 1580098 | 8/1966 | Fed. Rep. of Germany . | |
| 7634978 | 3/1978 | Fed. Rep. of Germany . | |
| 8004562 | 5/1980 | Fed. Rep. of Germany . | |
| 3125093 | 6/1981 | Fed. Rep. of Germany . | |
| 3206288 | 2/1982 | Fed. Rep. of Germany . | |
| 3211319 | 3/1982 | Fed. Rep. of Germany . | |
| 8312000 | 4/1983 | Fed. Rep. of Germany . | |
| 46-34356 | 10/1971 | Japan | 362/32 |
| 2066444 | 7/1981 | United Kingdom | 362/32 |
| 2068593 | 8/1981 | United Kingdom | 165/42 |

Primary Examiner—Larry Jones
Assistant Examiner—Carl D. Price
Attorney, Agent, or Firm—Woodcock Washburn Kurtz Mackiewicz & Norris

[57] ABSTRACT

The invention pertains to a control unit, especially for setting heating, cooling and/or ventilation systems in motor vehicles. Sliding members are guided between two end positions in an oblong body. Setting members, e.g., louvers or motors, are adjusted by means of these sliding members via transmission means. A step-down unit is provided as the transmission means, which consists of a first toothed rack molded onto the sliding member and of a second toothed rack molded onto the body, and a gear which is mounted rotatably between the two toothed racks and moved when the sliding member is moved. The gear is connected to an adjusting means, e.g., a rod, which in turn operates the setting member.

27 Claims, 9 Drawing Figures

CONTROL UNIT

BACKGROUND OF THE INVENTION

The present invention pertains to a control unit for setting heating, cooling and/or ventilation systems in motor vehicles and in particular, such control units containing a sliding member with a control lever which is guided between two end positions and which actuates setting members.

The control units of this kind, which are arranged on the instrument panels of motor vehicles, are used for opening to variable extents distribution louvers of cool or warm air vents in motor vehicle systems, and are often called heating-cooling systems. The vents or other members are usually actuated via Bowden cables.

A Bowden cable is also provided in the control unit which is described in DE-OS No. 31 25 093. This control unit consists of an oblong body with a canal provided within it, and a sliding member in the canal which can be slid between two end positions. The sliding member is guided in the canal by rollers attached to it, which rest against the canal walls. Projecting in different directions, a control lever projecting from the body and an adjusting arm are provided on the sliding member. The Bowden cable is operated by means of the adjusting arm, and this adjusting arm is also a switching means carrying a contact bridge which cooperates with fixed contacts of the body in the manner of a sliding switch.

Another control unit for a heating and cooling fan of a motor vehicle is known from DE-GM No. 83 12 000. A part of a handwheel which is held rotatably in a body projects from the instrument panel. A pinion is molded onto the handwheel. The teeth of the pinion mesh with the teeth of a gear which in turn meshes with the teeth of a toothed rack. The toothed rack is held in a guide of the body in a longitudinally movable manner. A plurality of contacts located in rows next to each other are actuated by a cam provided on the toothed rack as the toothed rack is slid to different stop positions. The fan motor is thus switched on and off stepwise. A display unit which is visible from the outside through a transparent zone of the instrument panel is connected with the toothed rack.

Since the sliding members of the heating and ventilation control units of motor vehicles reach through slots, the inner mechanism becomes easily contaminated. Also, foreign light is often emitted through the slot in the case of illuminated control units. To avoid this, it was proposed in DE-OS No. 32 11 319 to cover the slot by a tape which is attached to the sliding member. The ends of the tape can be open or an endless tape can be used. The tape itself is guided in an opening on both sides of the slot between a body and a cover plate.

Another control unit with illuminated control knobs was described in DE-OS No. 32 06 288. There are one or more than one sliding members which are guided in slots of the body. Via an intermediate lever the sliding member actuates an adjusting lever to which is attached a Bowden cable. The control knobs mounted on the sliding members on the outside are illuminated by mobile light guides. The light guides emanate from a light source and are led in the middle through the sliding member and to the control knob.

An illuminated display of the actual operating position of the sliding members is provided in the control unit disclosed in DE-AS No. 15 80 098. The sliding members are led in slots of a body, and the pins projecting from other slots transmit the sliding motion of the sliding members via lever bars to actuators, which in turn move the Bowden cables. Luminous strips which extend over the entire adjustment range of every individual sliding member are provided on the front side of the body. They are visible from the outside as a light band. Each luminous strip is illuminated via a frame part prepared from transparent plastic, which collects the rays and sends them to the light guides. To better visualize the start and end positions of the sliding member the luminous strip is wedge-shaped at the front end. Colored illumination can also be provided. However, it is not apparent from this publication how this is to be done.

Another control unit for motor vehicles, in which the control knobs of the sliding members are illuminated, is known from DE-GM No. 76 34 978. The sliding members are guided in slots of the body. The light necessary to illuminate the control knobs reaches the control knobs from a central light source after deflections via light carrier arms or light guides. On the light transmission surfaces the light guides are corrugated so that a diffusely illuminated surface is obtained. The light guides are prepared from polymethacrylate by injection molding. The central light source is inserted into an opening of a block from which the light guides are led out. A light-emitting diode which is able to emit white as well as colored light, is used as the light source.

A light guide bar for colored illumination of instruments in motor vehicles is described in DE-GM No. 80 04 562. A colored layer with a thickness of 30 microns is applied on the reflecting surface of the light guide bar. This colored layer is topped by a second, white layer. A separate light guide bar is used for each color. It is not possible with this solution to illuminate two different colored surfaces one after another with the same light guide bar.

SUMMARY OF THE INVENTION

The primary object of the present invention is to provide an improved control unit of simple design and with reduced weight, of the type having sliding members guided between two end positions. The unit is constructed in such a way as to ensure the satisfactory, low-friction and reduced-speed straight-line motion of the sliding members with reduced depth, and is characterized by a simple, non-glare, multicolor display of the set positions of the control members. The display, which is clearly visible in darkness, is provided by a single light source, and the emission of foreign light as well as motor noise from the slot is prevented or reduced and the risk of contamination of the inner mechanisms is reduced. Each sliding member acts upon a setting member through transmission means which consist of a step-down unit with a moveable first toothed track and a second fixed toothed track, with at least one gear arranged in a rotating or sliding manner between the two racks and also connected to an adjusting element, the adjusting element acting directly or indirectly on the setting member.

BRIEF DESCRIPTION OF THE DRAWINGS

The present invention is described below in detail based on the following Figures.

DESCRIPTION OF THE PREFERRED EMBODIMENTS

Figure 1:
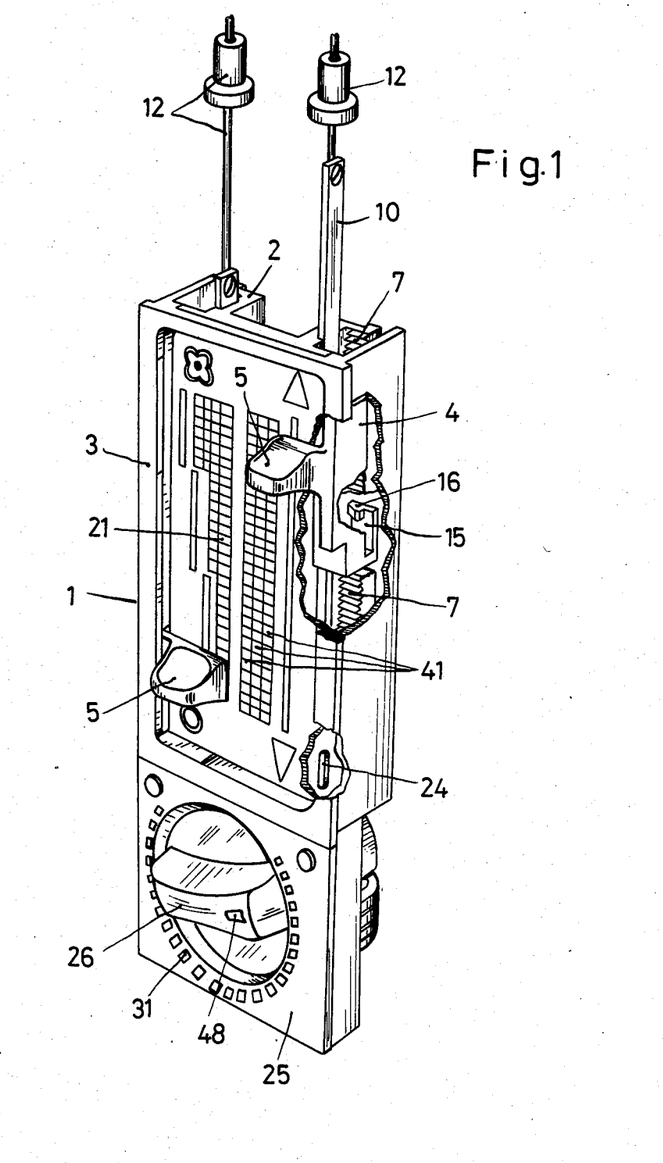
FIG. 1 shows a perspective view of a control unit in accordance with this invention.

FIG. 1 shows a perspective view of a control unit as can be used, e.g., for setting heating, cooling and/or ventilation systems in motor vehicles. The embodiment shown here has two sliding members each operated by lever 5, and one control knob 26. Setting members are operated, mostly in an indirect manner, with these slide members and the control knob. The setting members can be mechanical components, e.g., louvers, or electrical components, e.g., motors. While the mechanical setting members are actuated indirectly via toothed racks, cord drives, Bowden cables, etc., the electrical components are actuated in an indirect manner, e.g., via potentiometers or switches which are actuated by a control knob or slide. The value of the voltage tapped is proportional to the extent of adjustment, in a known manner.

Figure 2:
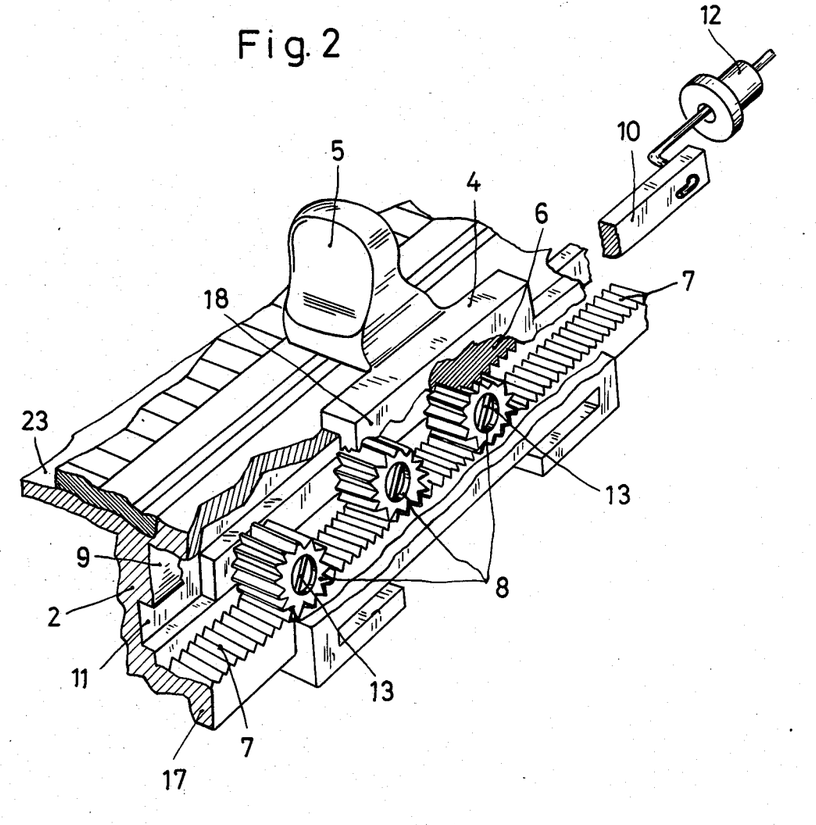
FIG. 2 shows a perspective view of a partial cutaway of a section of the control unit of this invention on an enlarged scale.

FIG. 1 shows an oblong plastic body 2 of U-shaped cross-section, whose reinforced slide walls each have an oblong opening 9 (FIG. 2). A step-down unit comprising a sliding member 4, which is movable along the body between two end positions, is arranged in each opening 9. The sliding path of the sliding member 4 is limited by a projection 24 serving as a stop, which is molded onto the body. Projections are preferably provided at both ends of the sliding path.

Figure 3:
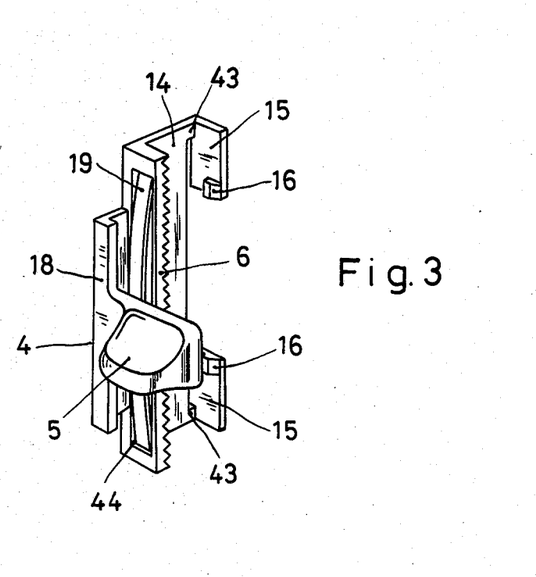
FIG. 3 shows a perspective view of the sliding member of the control unit with brake spring.

As is apparent from FIG. 3, the sliding member 4 has a U-shaped slide with a slide base 14. Two holding members 15, which are connected with the slide base to form a single piece on the front end of the slide base via a narrow bridge 43, are molded to the slide base on one of its sides at right angles. The holding members are springy due to this type of connection. This is of significance because there is a toe 16 at the free end of each holding member. After snapping in, these toes serve to hold and guide the sliding member on the body. The guiding is such that the toes 16 grip behind a web 17 (FIG. 2) which extends on the lower side or the back side of the body at the edge.

As is shown in FIG. 3, the sliding member 4 is formed on the other side of slide base 14 by a first toothed rack 6 which has inner teeth. A brake spring 19 is inserted into a recess 44 on the outer side of the first toothed rack 6. This brake spring is prestressed against a wall of the opening 9 in the body 2, on the one hand, and against the sliding member 4, on the other hand. The desired sliding path of the sliding member can be preselected within certain limits thanks to this prestress.

An angle 18 whose bent, free knee carries a control lever 5, is molded onto the slide base 14 flush with it and as its extension. The control lever 5 staggered relative to the slide base 14 and thus relative to that part of the angle 18 which is located in the same plane as the slide base and which reaches through the slot formed between the body 2 and the cover frame 3, so that a kind of labyrinth seal is formed. This arrangement provides a significant degree of protection against contamination of the inside of the unit. Moreover, additional protection, both mechanical and electrical, is provided by the fact that it is not possible to push a narrow object through the slot and inside the mechanism. In addition, the motor noise is muffled or, if the back side of the control unit is covered with a cover, is strongly reduced.

Referring to FIG. 2, the lateral opening 9 of the body has a linear drive with a step-down unit. This consists, among other things, of a first toothed rack 6 of the sliding member 4 and of a second toothed rack 7 which is formed on the lower wall of the opening 9 on the body. In the embodiment shown in the figures, three gears 8 are mounted rotatably between the two toothed racks. Embodiments in which there are only two, or even more gears are, of course, within the scope of the invention. The gears 8 are attached to pins 13, but in such a way that they are able to rotate. The pins in turn are injection molded onto a rod 10 which is guided in a groove 11 on the bottom of the opening 9. As is illustrated in FIG. 2, the pins 13 are at right angles to the sliding direction of the rod 10.

If the sliding member is being moved, the gears 8, whose teeth mesh both with the teeth of the first toothed rack 6 and with the teeth of the second toothed rack, rotate The rod 10 is carried by one or more pins 13 and thus also is moving with the gears. The sliding path of the rod is half the sliding path of the sliding member due to this step-down unit. Therefore, the first toothed rack 6 is somewhat longer than half the sliding path of the sliding member 4. It is preferred to use at least three gears in order to ensure reliable sliding, because only two gears mesh with the two toothed racks at the beginning and the end of the sliding path of the sliding member in the vicinity of the stops. In the middle of the sliding path of the sliding member the first toothed rack 6 meshes with all three gears.

As is illustrated in the FIGS. 1 and 2, a Bowden wire 12 is connected with each rod 10. Mechanical setting members not shown in the figures are adjusted with this Bowden cable. Besides this mechanical transmission of force, an electrical connection can be provided as well, although such an embodiment is not shown in the figures. To do so, the groove 11 is provided with a slot. A carrier molded onto or otherwise attached to the rod 10 reaches through this slot, and a spring support of a potentiometer is adjusted with this carrier. The voltage tapped by the contact spring of the spring support is transmitted to a preferably electrical setting member, e.g., a motor, via an electrical connection. Any other connection between rod 10 and the electrical position setting element may be utilized.

The embodiment shown in FIG. 1 has two sliding and one rotary setting possibilities, and the body 2 is covered by a cover frame 3 on the side and at the edge, where the slot for the sliding member is located. If more than two sliding setting possibilities are desired, several bodies can be arranged next to each other as necessary, and be covered by a common cover frame, but always so that the existing slot is covered and protected by a web of the cover frame.

As is apparent from FIG. 1, a capability for rotary setting is provided by means of a knob 26. The body 2 is complemented for this purpose with a projection 25 on its narrow side, which projection is attached either to the cover frame 3 or to the body 2, or is connected with it to form one piece with it. This projection 25 is approximately square, and the width of the projection 25 corresponds to the width of the body 2 with the cover frame 3.

Figure 4:
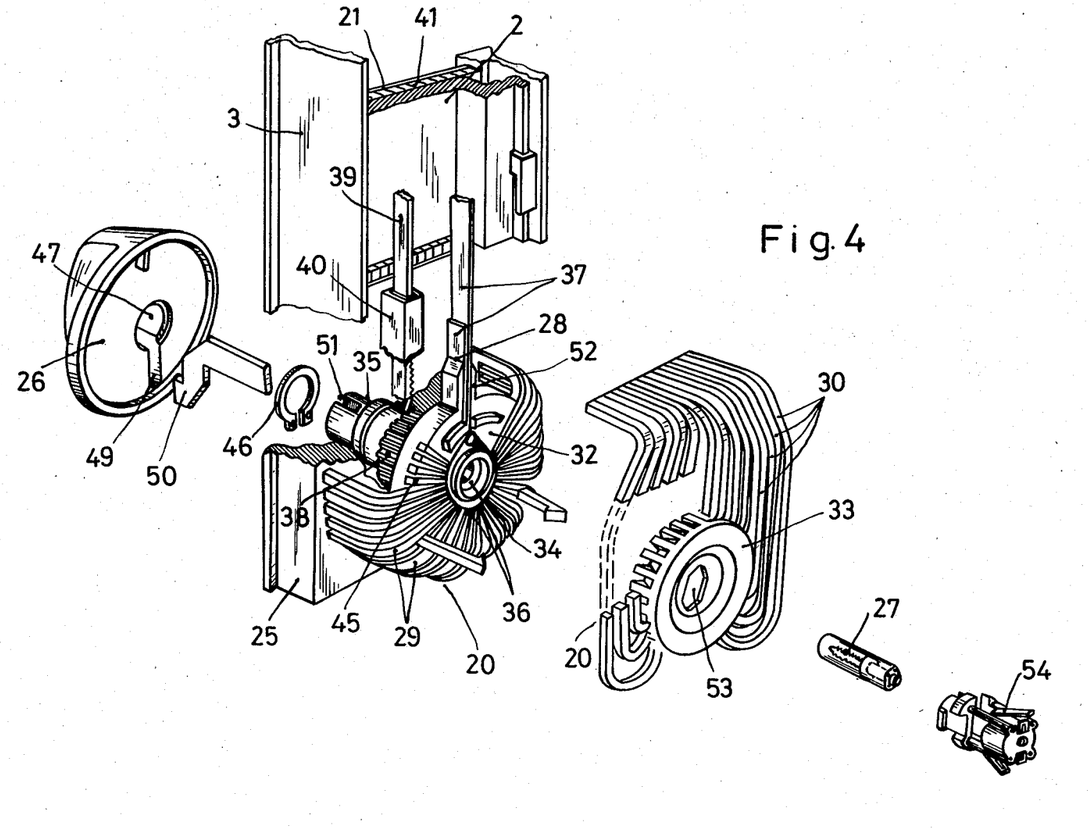
FIG. 4 shows a perspective exploded rear view of the luminous center of the control unit.

Similarly to the sliding member 4, the knob 26 can also be used, e.g., via a toothed rack, to adjust a mechanical setting member, or to adjust an electrical setting member via a potentiometer or other like electrical element. The embodiment shown in FIG. 4 illustrates a first solution with a mechanical setting member. However, a solution can also be utilized in which the toothed rack moves the spring support of a potentiometer.

In order to better recognize the positions of both the knob 26 and of the sliding members, especially in darkness, the control unit has, as is apparent from FIG. 4, an illuminated display unit. This consists of a luminous center 20 from which light guides are led out in two planes. The light guides 29 of the first, lowermost plane are arranged in a star-shaped pattern relative to the luminous center. The ends 31 of the light guides 29 form therefore a segment and are, as is apparent from FIG. 1, visible on the front side of the projection 25. Since they are located next to each other, a thermometer scale-like luminous band display is thus achieved. Better visibility of the knob position is achieved by colored illumination of the ends 31 of the light guides 29. If the knob 26 is used, e.g., for warm-cold setting, a blue/red color display is used. The color display must, however, be such that all ends 31 show only red light in one end position of the knob and show only blue light in the other end position.

The luminous center 20 is located on the back side of the projection 25. A round first part 32 made of plastic is attached to the projection on the back side. Radial indentations which receive the light guides 29 of the first plane are provided in the first part 32. Furthermore, a central recess 34 is provided in the middle, in which a knob 35 is mounted rotatably. This knob is in the form of a hollow cylindrical shaft which reaches through the projection 25 and is secured on the front side by a retaining ring against axial displacement.

A recess 47 is provided in the middle of the knob, which recess continues in the handle and which is covered on the front side of the handle by a window 48 (FIG. 1) made of a transparent material. A depression 49 extends radically from the recess 47. An insert 50 which is prepared from a light-conducting material, is inserted into the recess 47 and into the depression 49. As is apparent from FIG. 4, this insert 50 is bent multiply and is bevelled to deflect the light rays.

The rotary body 35, which is carried by the knob 26, has two diametrically opposed openings 51 on the end face. The insert 50 reaches on one side into one of the openings, and a carrier molded on, which reaches into the recess 47 and which is not shown in the figures, reaches into the other opening on the other side. To fasten the knob to the rotary body the carrier and the opening are designed in such a way that a slide fit with snap-in effect is obtained.

On the back side of projection 25 and in the immediate vicinity of the rotary body 35 there is located a molded-on guide bead 40 with a continuous guide chamber for accommodating a third toothed rack 39 that is slidable therein. On the side the third toothed rack is provided with teeth which mesh with the teeth of the pinion 38 through an opening in the guide chamber. When the rotary body is rotated by the knob, the third toothed rack is moved, and mechanical setting members or even sliding potentiometers or sliding switches, which in turn set mostly electrical setting members into motion, mainly in electrical paths.

At least the section of the rotary body 35 which reaches into the first part 32 consists of a transparent material. Between this section and the wall of the central opening 34 colored ribbons 37 are led and are attached to the rotary body. One colored ribbon is red and another is blue. Both colored ribbons are longer than the light guide entry points 36 distributed over the circumference. They are preferably longer than the inside extension of the central opening 34. In order to avoid incorrect color due to overlapping colored ribbons, an outlet opening 28 is provided in the first part 32, through which opening the colored ribbon portions which are not needed in a given position of the knob project. In order to avoid damage to the colored ribbons, the colored ribbons are arranged in a guide 52. Depending on the position of the knob part of the ends 31 of the light guides 29 emits red light and the other part emits blue light. It can thus clearly be recognized how the heating and the fresh air ventilation are set in the vehicle. Since all ends of the light guides should emit light of one color only in the end stop positions, each colored ribbon must be longer than the light guide entry points 36 distributed over the circumference.

While the light guides 29 of the first part 32 of the luminous center 20 transmit colored light, the light guides 30 transmit only while light. These light guides 30 are arranged in a second plane and are held in a second part 33 of the luminous center 20. The second part 33 is connected with the first part, e.g., by a snap-in connection. A cutout 53 is provided in the middle of the second part, into which a lamp socket 54 with a light source 27 is inserted. This light source reaches both into the first part and into the second part. An embodiment in which the lamp socket is molded in one piece together with the second part is also within the scope of the invention.

Figure 5:
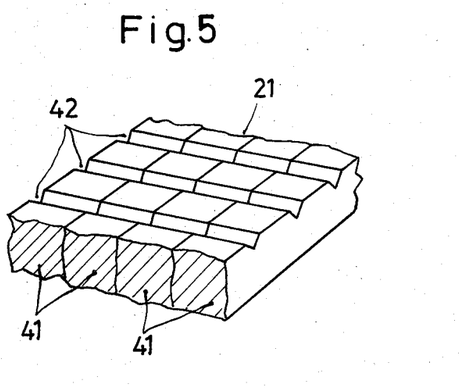
FIG. 5 shows a perspective view of a light guide body consisting of a plurality of light guides, which is arranged on the back of the control unit.
Figure 6:
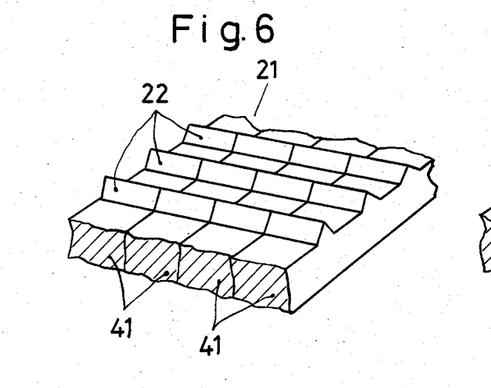
FIG. 6 shows another light guide body embodiment in the same representation as FIG. 5.

The light guides 30, which are led out from the second part 33 in the second plane, and are arranged in an approximately circular pattern, are led to a light guide body 21 located in one plane, which said light guide body is located on the front side of the body 2. This light guide body 21 consists of mere elementary light guides 41 in the embodiment shown in the FIGS. 5 and 6. Area illumination is to be achieved with an elementary light guide 41, in order to better recognize the actual position of the sliding members. One of two possible designs can be selected for the area illumination, which designs are shown in FIGS. 5 and 6. FIGS. 5 and 6 show the elementary light guides 41 lying on the back, i.e., in such a way that when built in, the elevations 22 and the indentations 42 are on the lower side, i.e., opposing each other on the surface of the body. The light is deflected by the elevations and indentations, and is directed to the smooth surface.

As is apparent from FIG. 1, the elevations and the indentations do not extend over the entire length of the elementary light guides. It is important to achieve the most uniform illumination possible of the entire surface. Since the light guides 29 and 30 and the elementary light guides 41 are prepared by the injection molding process, the design according to FIG. 5 is more difficult to prepare because of the dies needed. The embodiment according to FIG. 6 is therefore preferred. To prepare this embodiment, an indentation whose surface can be polished to a very smooth finish, contrary to an elevation, is prepared in the injection mold in analogy to the elevation 22 of the elementary light guide 41. A smooth surface can thus be achieved for the elevation 22 in a relatively simple manner. This smooth surface is very important for the light deflection and scattering. Due to the prior guiding in the light guide 30, the light rays are not radiated parallel to the surface anyway, so that they can be deflected on the elevations 22 towards the smooth surface. In this manner only a small portion of the rays is deflected per elevation, so that a relatively good, uniform emission from the entire elementary light guide is achieved.

Figure 7:
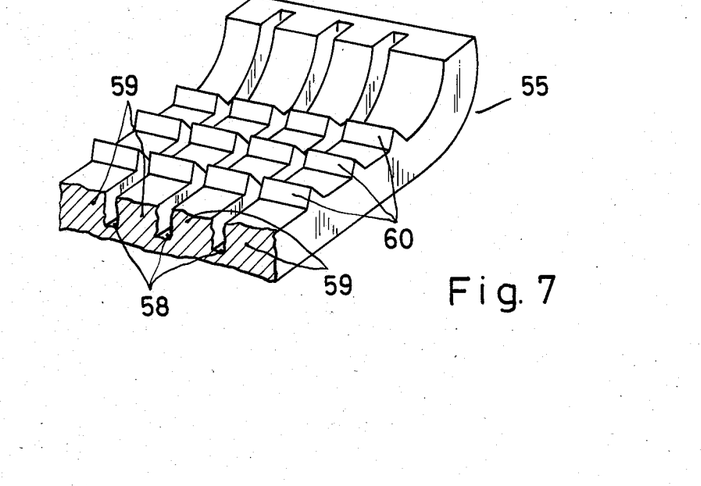
FIG. 7 shows a perspective view of a one-piece light guide body as used in the control unit.
Figure 8:
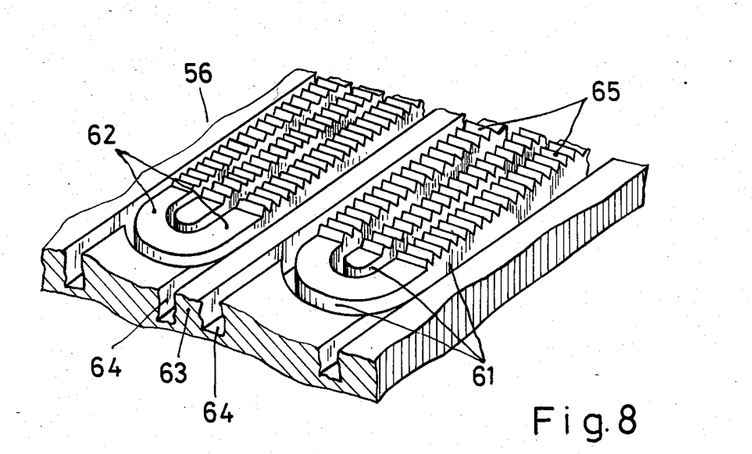
FIG. 8 shows another one-piece light guide body as used in the control unit, in the same representation as FIG. 7.
Figure 9:
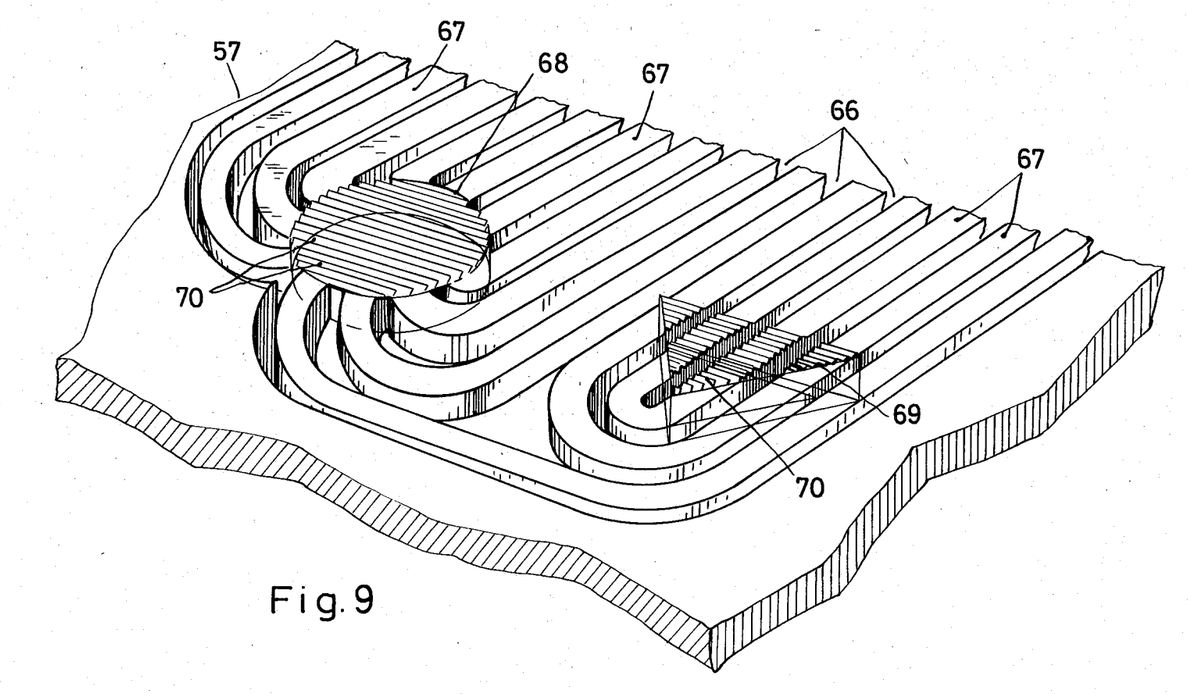
FIG. 9 shows yet another light guide body in the same representation.

A plurality of elementary light guides are arranged close to each other in the embodiment shown in the Figures. It is, of course, also within the scope of the invention to use a single light guide panel only. FIGS. 7 through 9 show three examples of a one-piece light guide panel 55, 56, and 57. Just as in FIGS. 5 and 6, they are shown lying on the back.

A plurality of parallel furrows 58 are worked into light guide panel 55 in the embodiment according to FIG. 7. The furrows separate the light guides 59 from one another. As was mentioned already in the description in connection with FIG. 6, elevations 60 are provided for deflecting and scattering the light for reasons of toolmaking. At the end of the body the light guides 59 are bent back and led from there to the luminous center.

Another example of a one-piece light guide panel 56 is shown in FIG. 8. A plurality of furrows 61 are provided here as well, which can also be curved, contrary to the furrows in FIG. 7. Light guides 62 are thereby formed, which pass over into another. An optimal utilization of light is thus guaranteed. Approximately in the center of FIG. 8 there extends a straight line guide 63 which is bounded by two straight furrows 64. This light guide 63 is used, e.g., to illuminate a switch not shown. Elevations 65 are provided here as well, whose extensions correspond to the area to be illuminated. A larger area should be illuminated as uniformly as possible in FIG. 8. It is, of course, also possible to illuminate small areas or symbols, e.g., circles, triangles, etc. To achieve this, it is only necessary for the elevations to be of a corresponding shape.

One possible design is shown in FIG. 9. This light guide panel 57 also has a plurality of furrows 66, by which the different light guides 67 are formed. The light guides 67 are led to the areas 68 and 69 to be illuminated, and all light guides are utilized to the extent possible. The light guides have elevations 70 in the points and areas which are to be illuminated in this case as well.

As is shown especially in FIG. 2, a recess 23 is provided on the front side of the body 2, which said recess accommodates the light guide body. This guarantees better protection for the light guide body. In addition, the light guide body can be covered with a foil carrying lettering and/or symbols more easily, if necessary. Plexiglas (polymethylmethacrylate) is usually used as the transparent material for light guides. The limit of the dimensional stability of this material is about 90° to 100° C. Since very high temperatures may occur in motor vehicles, it is expedient to use a material which has range of broader applications and better light conductivity. A material which meets these requirements is polycarbonate (trademark: Macrolon). The dimensional stability is 140° to 150° C. The range of applications in which high strength, rigidity, hardness and toughness are guaranteed is between −150° and +135° C. The refractive index, equaling 1.56 to 1.65, is very high for transparent plastics.

We claim:

1. A control apparatus of the type having at least one setting member for setting heating, cooling or ventilating systems in motor vehicles said control apparatus comprising an oblong body, at least one sliding member slidable along said oblong body on a sliding path, in said oblong body, said sliding member including a U-shaped slide and a control lever, said control lever projecting from said slide and from said oblong body, said U-shaped slide including a slide base, a first toothed rack connected to said slide base forming a first leg of the U-shaped slide and at least two holding members, each of said two holding members having a projecting toe, the two holding members being connected to said slide base for collectively forming a second leg of the U-shaped slide, the U-shaped slide being positioned around a projecting portion of the oblong body with the two projecting toes slidingly engaging a surface of the projecting portion of the oblong body between the two projecting toes and the slide base thereby holding the U-shaped slide to the oblong body, and transmission means for operatively connecting said slide member with said setting member, and further characterized in that said transmission means comprises a step down unit having a fixed second toothed rack molded to said body and at least one gear in functional connection with the first and second and make toothed racks, and an adjusting means for coupling said at least one gear and said setting member, said at least one gear being operatively connected between the first and second toothed racks.

2. The control apparatus in accordance with claim 1, characterized in that said oblong body has a lateral opening, said step-down unit being located in said lateral opening.

3. The control apparatus in accordance with claim 1, characterized in that said adjusting means includes a sliding rod, said oblong body having a groove receiving and guidingly positioning said sliding rod.

4. The control apparatus in accordance with claim 3, characterized in that a Bowden cable is attached to said rod.

5. The control apparatus in accordance with claim 3 characterized in that said at least one gear is rotatably mounted on a pin extending from said rod at a right angle to an elongated dimension of said rod.

6. The control apparatus in accordance with claim 1, characterized in that said first toothed rack is longer than half a maximum length of movement of the sliding member along said sliding path.

7. The control apparatus in accordance with claim 1, characterized in that an angle reaching through said body is molded to said first toothed rack, a portion of said angle carrying said control lever.

8. The control apparatus in accordance with claim 7, characterized in that said control lever is laterally offset relative to said slide base.

9. The control apparatus in accordance with claim 1, characterized in that said sliding member carries a brake spring on said first leg of said U-shaped slide, said spring is positioned between said first toothed rack and a surface portion of said body in a prestressed state.

10. The control apparatus in accordance with claim 1, characterized by comprising a cover frame, said body being inserted into said cover frame.

11. The control apparatus in accordance with claim 1, characterized in comprising several bodies (2) placed next to each other, and a common cover frame covering said several bodies.

12. The control apparatus in accordance with claim 1, characterized in said transmission means comprises a plurality of gears, at least two of said plurality of gears always engage with the teeth of said first toothed rack.

13. The control apparatus in accordance with claim 1, characterized in comprising a stop in the form of a projection on said body at least at one end of said sliding path.

14. The control apparatus in accordance with claim 1, characterized in comprising a projection adjoining said body, and a control knob carried on said projection.

15. The control apparatus in accordance with claim 14, comprising an illuminated display unit havng light source, and fiber-optic light guides each led radially out from said light source, said light source and said fiber-optic light guides being located on one side of said projection.

16. The control apparatus in accordance with claim 15, characterized in that said fiber-optic light guides are arranged in a first plane and in a second plane displaced from the first plane.

17. The control apparatus in accordance with claim 15, characterized in that the light guides and the light guide bodies are prepared from polycarbonate by injection molding.

18. A control apparatus of the type having at least one setting member for setting heating, cooling, or ventilation systems of motor vehicles, comprising an oblong body, at least one sliding member slidingly engaged with said oblong body, a control lever mounted to said sliding member and projecting from said oblong body, a first transmission means for operatively connecting said sliding member said setting member, said first transmission means comprising a step down unit including a movable first toothed rack molded to said sliding member, a second toothed rack molded to said body and at least one gear in functional connection with the first and second toothed racks; adjusting means coupling said setting member and said at least one gear being operatively connected, said at least one gear between the first and second toothed racks, a projection adjoining a narrow side of the oblong body, a control knob carried on said projection from the oblong body, an illuminated display unit including a light source and fiber-optic light guides led radially out from said light source on one side of said projection, a first set of said fiber-optice light guides being arranged in a first plane around said light source and a second set of said fiber-optic light guides being arranged in a second plane around said light source displaced from the first plane.

19. The control apparatus in accordance with claim 18, characterized in that said light guides of the first plane are arranged so that ends of said light guides reach through said projection and are located next to each other in a ring-shaped pattern to provide for a thermometer scale-like display of the position of said control knob.

20. The control apparatus in accordance with claim 18, characterized in that said illuminated display unit further comprises a first part connected with said projection and a second part fastened to said first part, and wherein the lights guides of said first plane are held in said first part and the light guides of said second plane are held in said second part.

21. The control apparatus in accordance with claim 20, characterized in comprising a rotary body (35) connected to said control knob, movable relative to said first part and positioned in a central opening in said first part.

22. The control apparatus in accordance with claim 21, characterized in that said first part (32) has light guide entry points, and comprising at least one colored tape attached to said rotary body (35) and led between said rotary body (35) and a wall of said central opening covering said light guide entry points (36), said colored tape having a length sufficient to cover all said light guide entry points, and further comprising at least one outlet opening on said first part (32) for receiving an end of said colored tape.

23. The control apparatus in accordance with claim 21, characterized in comprising a third toothed rack, and wherein said rotary body has a pinion with teeth which mesh with teeth of said third toothed rack (39), a guide bead molded onto the side of said projection opposite the central knob between the light guides, said guide bead having a guide chamber, and said third toothed rack being guided in said guide chamber.

24. The control apparatus in accordance with claim 18, characterized in comprising a light guide body on the front side of said body, the light guides of said second plane being led to said light guide body.

25. The control apparatus in accordance with claim 24, characterized in that said light guide body comprises a plurality of elementary light guides.

26. The control apparatus in accordance with claim 24, characterized in that said body has a recess side, and that said light guide body is located in said recess.

27. The control apparatus in accordance with claim 24, characterized in that the back side of the light guide body or the elementary light guide has locally limited elevations or indentation.

* * * * *